Feb. 28, 1961 F. KOURY ET AL 2,972,803

METHOD OF MAKING A LIGHT AMPLIFIER AND STORAGE DEVICE

Filed July 1, 1957

INVENTOR.
FREDERIC KOURY
FREDERICK A. LOUGHRIDGE
BY
Kenway, Jenney, Witter + Hildreth
ATTORNEYS United States Patent Office 2,972,803

Patented Feb. 28, 1961

2,972,803

METHOD OF MAKING A LIGHT AMPLIFIER AND STORAGE DEVICE

Frederic Koury, Lexington, and Frederick A. Loughridge, Peabody, Mass., assignors, by mesne assignments, to Sylvania Electric Products Inc., Wilmington, Del., a corporation of Delaware Filed July 1, 1957, Ser. No. 669,180

6 Claims. (Cl. 29—155.5)

Figure 1:
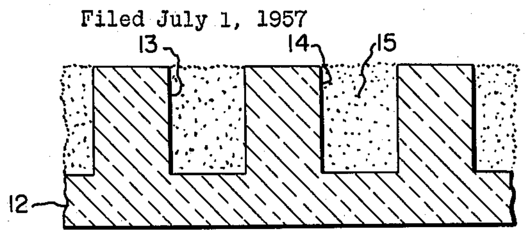

This invention relates in general to methods and devices for the amplification and storage of light or of other radiant energy. Specifically, the invention relates to a device for amplifying the brightness of an optical image or for storing energy in the form of light for any one of numerous applications, such as the memory unit of a computer, television in black and white or color, or for any system where the storage or amplification of light is useful.

The amplification of light by combining a layer of photoconductive material with an electro-luminescent layer is now a well-known technique. In fact, in the prior pending application of Frederic Koury, Ser. No. 631,131, filed December 28, 1956 and assigned to the same assignee as the present application there is disclosed an improvement on such known light amplifiers. The improvement which is disclosed in that application relates to the structure of the photoconductive layer of the device. Prior to that invention, the photoconductive layer in the light amplifier was relatively inefficient in that the incident light did not penetrate the entire layer. Thus, the change in resistance due to the photoconductive effect was limited, the photoconductivity being a surface effect. In the previous invention there was provided a number of apertures in the photoconductive layer. In the preferred embodiment of that invention, the holes extend entirely through the layer from one side to the other. An electrical connection is provided on each side of the layer and a continuous surface path between the electrical connections along the inside surface of the holes is established. In this way, the entire path from one side of the layer to the other is directly affected by incident light rather than just the outer layer surface of the prior art devices.

Although the improvement in efficiency derived from the use of that invention was considerable, further efforts have been made to improve the device. One of the techniques developed has shown some promise. This technique involves the etching of a glass plate to remove areas of the glass and leave a number of glass columns. The columns are then treated to form the photoconductive layer. Unfortunately however, it has proven at least at the present time, impossible to achieve the degree of accuracy and reproducibility necessary for devices made in this way to be successful commercial products.

Therefore, it is an object of the present invention to provide a technique and product which are feasible for use in large scale production of light amplifiers and storage devices.

Another object of the invention is to provide accurate and consistent light amplifiers and storage devices.

Still another object of the invention is to reduce the cost of light amplifiers and storage devices.

A further object of the invention is to reduce the waste usually assoicated with the fabrication of light amplifiers and storage devices.

A still further object is to provide a light amplifier and storage device, the geometry of which is the principal determining factor of the operating characteristics of the device.

A still further object is to simplify the technique of fabricating light amplifiers and storage devices.

In general, the present invention consists in an accurately dimensioned and easily reproducible matrix for a photoconductive layer combined with an electroluminescent layer in a light amplifier or storage device. The matrix is formed from a piece of glass plate of dimensions which are relatively uncritical. The glass is cemented to a steel plate and run through a milling machine on the arbor of which are mounted ganged saws. Two passes of the plate are made under the saw, one pass at right angles to the other. A series of square pedestals are thus formed on one side of the glass.

The glass panel is then packed with some substance which is easily removed after it serves its purpose. Refractory materials such as calcium oxide, sodium aluminate, powdered Alundum or other suitable material are preferred. The slots are filled until the material is even with the tops of the glass pillars. This may be accomplished by wiping the top surface with a suitable knife blade. The glass panel is then cemented to a metal plate and is vibrated until the refractory powder is packed to a point which is a predetermined distance below the pillar tops.

The panel is then heated and sprayed with a conductive film. After the panel has cooled, it is washed in running water which removes the powder entirely. The conductive film is also removed from the slotted areas except for a small portion on the walls of the slots extending the panel surface. In other words, only conductive caps are left on the pillars.

Independently of the foregoing operations, an electroluminescent member is prepared to receive the glass panel. The materials used and the method of preparation of the electroluminescent member may advantageously be as described in the previously cited copending application, Ser. No. 631,131, filed December 28, 1956. A suitable electroluminescent member includes a glass base plate which is coated with a transparent conductive film and has an electroluminescent layer disposed upon the conductive film. Glass frit is sprayed on top of the electroluminescent layer and the previously prepared slotted glass blank is then placed on the frit with the conductive pillar caps in contact with the firt. The assembly is then fired, causing the frit to glaze bonding the electroluminescent member to the slotted glass blank. The assembly is then passed through a grinding machine to expose a symmetrical group of independent glass pillars sealed in position on the electroluminescent member. After the backing is ground away, a conductive surface is formed on the exposed pedestal ends by the application of platinum or silver. Alternatively, the original technique of placing a conductive coating may be repeated. The distance between this coating and the top of the electroluminescent layer is controlled by the depth of grinding of the backing, in the case of the surface application of metal, but if the alternative procedure is followed, the dimension in question is not dependent upon the grinding operation. An opaque webbing is then formed between the glass pillars or pedestals by flowing an opaque substance such as black frit in a liquid vehicle or black enamel through the slots. The webbing so formed is adjacent the electroluminescent layer.

Figure 2:
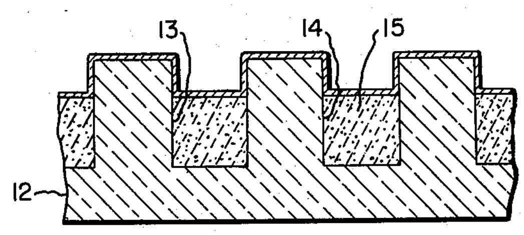
Figure 3:
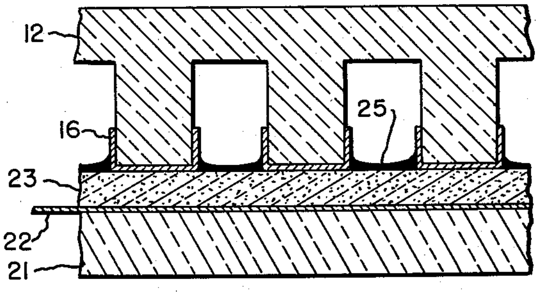
Figure 4:
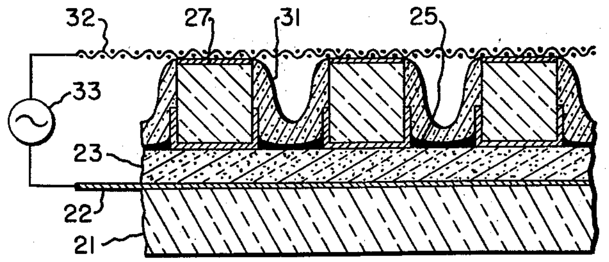

The assembly is then sprayed with a photoconductive material such as cadmium sulfide in an organic vehicle such as ethyl cellulose acetate lacquer. The photoconductive material covers the glass pedestals and partially fills the area between pedestals. The assembly is then fired to sinter the photoconductive material to the glass. To provide a suitable conductive surface, the tops of the glass pillars are then ground with metallurgical polishing paper. This polishing operation is carried out only to the extent necessary to expose the conductive film caps on the pedestals. Electrical energization of the device is achieved by applying a suitable potential between the conductive coating of the electroluminescent member and the top electrode which is in contact with the conductive film caps on the pedestals. The top electrode which is placed on the conductive film surfaces may be an electroformed metal screen bonded by silver or by fusible alloys to the conductive film surfaces. Alternatively, a capacitive input coupling may be furnished by coating the conductive film surfaces with a silicone or melamine alkyd binder against which an electrode is placed to provide capacitive input coupling. These and other objetcs, features, and advantages will become apparent from a reading of the following detailed description of a preferred embodiment of the invention which has been selected for purposes of illustration only and is shown in the accompanying drawings in which:

Fig. 1 is a schematic view of the glass blank or matrix showing the slots and the refractory material deposited in the slots, Fig. 2 is a schematic view of the matrix in which the refractory material has been packed and on which the conductive coating has been sprayed, Fig. 3 is a schematic view of the assembled electroluminescent member and matrix prior to the grinding of the back of the matrix, and Fig. 4 is a schematic view of the completed device.

The glass blank 12 illustrated in Fig. 1 may be of commercial tolerances running from .060" to .085" in thickness. A number of parallel slots such as 13 and 14 are cut in the glass block and similar slots are cut at right angles to those illustrated to provide a top surface which is composed of a series of symmetrically arranged pedestals preferably of equal size and equally spaced one from another. The depth to which the slots are cut is not critical although we prefer to hold it within a range of .40" to .45" for reasons which will become apparent in the description of the operation of the device below.

Although the slots may be formed in the glass blank in numerous different ways such as by etching or various photo-resist techniques, we prefer to form the slots with ganged saws mounted on a milling machine. The technique which we prefer is to mount our glass blank on a steel plate in any convenient way. Actually, the most satisfactory mounting method we have found is to use double-back pressure-sensitive tape. The use of such tape simplifies the attachment of the glass blank to the steel plate and gives a highly satisfactory temporary bond.

The steel plate with the glass blank attached is placed on the sliding table of a conventional milling machine. A number of similar, equally spaced saws is mounted on the arbor of the milling machine. A pass is made in one direction perpendicular to an edge of the glass blank to cut slots running in a first direction through the top surface of the glass blank.

The plate is then turned through 90° and remounted on the milling machine table. The same saws and same technique are then employed to cut slots perpendicular to those made in the first direction.

The panel is then detached from the steel plate and cleaned. After cleaning and drying, we pack the slots, preferably with a refractory material 15 such as calcium oxide, sodium aluminate, or powdered Alundum. This material is merely wiped across the surface by passing a knife blade across the top of the pillars. The passage of the blade wipes away the excess and leaves the slots filled with the refractory material.

We then pack the powder down into the slots by a vibratory process. The vibratory process is carried out by cementing the panel to a suitable metal plate preferably less than 1/16 of an inch in thickness. We then apply vibration to the cemented assembly as for example, by using a vibrating mechanism such as that sold under the trade-name Syntron. The vibration is continued until the powder is packed to a point .010" to .015" below the tops of the glass pillars. The disposition of the refractory material within the slots after the vibrating step is shown in Fig. 2.

It is then necessary to apply a conductive coating to the assembly. Because we have found that conductive coatings such as stannouschloride, which we prefer to use, must be applied to a hot surface in order to properly decompose the tin compounds, the panel packed with refractory maetrial is heated to a temperature of about 650° to 700° C. for about two minutes. We then spray the conductive film 16 over the tops of the pedestals and the refractory material. When the device has cooled, by the simple expedient of washing with running water, the refractory powder and the conductive film which is carried on the surface of the powder is removed. Thus, there is formed a device having conductvie caps disposed upon the tops of the pedestals.

The next process steps are illustrated in Fig. 3. The conductive caps 16 and the glass pedestals on which they are disposed are then sealed to an electroluminescent member. The electroluminescent member is prepared independently of the processing of the glass blank described above. One type of electroluminescent member which has proven satisfactory for our purposes includes a glass base plate 21 on which there is provided a surface layer of transparent conductive coating 22. This coating 22 is entirely similar to the coating 15 of which the conductive caps are formed. The manner of application of this coating is also identical to that of the application of coating 16. Over the coating 22 an electroluminescent layer 23 is placed. The electroluminescent layer may be applied in the manner taught in the pending application of Rulon, Ser. No. 365,617, filed July 2, 1953 and assigned to the same assignee as the present application. The electroluminescent layer 23 consists of phosphor embedded in a solid dielectric material. The phosphor may be of a type well-known in the art, for example, copper and lead activated zinc sulfide such as shown in U.S. Patent No. 2,728,730 issued to Butler and Homer, December 27, 1955 and assigned to the same assignee as the present application. The dielectric layer in which the phosphor is embedded can be of ceramic or glass also as shown in the above-cited application, Ser. No. 365,617.

Over the electroluminescent layer 23 we spray a solder glass of frit and the conductive caps are placed in contact with that frit in the manner illustrated in Fig. 3. The assembly is then fired to bond the two members together. The electroluminescent material has a tendency to deteriorate if it is overexposed to heat and therefore, this firing operation is conducted as quickly as possible without jeopardizing a good bond between the two members. A satisfactory compromise which has no deleterious effects upon the electroluminescent material and which provides an excellent bond may be made by running the assembly through a first heating cycle of three minutes at 525° C. and a second heating cycle of 45 seconds at 650° C.

After the elements are bonded together, an opaque material is flowed carefully through the slots and on the electroluminescent layer 23. A slim pipette or eye dropper may be used for this purpose and any one of several materials is suitable to form the opaque coating. A black frit in a vehicle such as xylol has proven to be quite satisfactory to form the opaque webbing 25. Alternatively, the solder glass frit used as a bonding substance between the glass blank and the electroluminescent layer may have a lead base. By treating only that portion of the frit between the glass pedestals with sodium sulfide, it is possible to obtain a lead sulphide which is sufficiently opaque for our purposes.

In the flowing operation, it is unnecessary to depend upon gravity to carry the opaque fluid or the sodium sulphide solution through the slots. With the assembly lying flat, capillary action is sufficient to draw the fluid through the slots and thus form the opaque webbing 25.

After the firing operation, which bonds the two elements together and the provision of the opaque webbing, we once more mount the assembly on a base plate and grind the back of the glass panel which joins the pedestals. This may be done on a surface grinder and the depth of grinding should be held fairly critically. Working to close tolerances in this operation is necessary, because we have found that the distance between the backs of the pedestals and the conductive caps has a controlling effect on the electrical characteristics of the ultimate device. The reasons for this will become plain after subsequent steps of the process are described.

When the grinding operation is completed, there are several alternative steps which we may take. Perhaps the simplest of these steps is to soak a felt pad with platinum bright and press that pad against the top surfaces of the pillars as they are shown in Fig. 4. The platinum adheres to the top surfaces of the pillars and gives a conductive surface on those areas. Alternatively, an air-drying type of silver paint or fusible indium alloys may be placed on the top surfaces of the pillars. Still another alternative step which may be taken is to substantially repeat the original process of forming the conductive caps 16. In other words, after the grinding operation the slots then exposed may be repacked with the refractory material and conductive caps of stannouschloride may be formed in the same manner as caps 16. The refractory material and the stannouschloride in the slots may then be washed away with running water as was done previously.

Following the formation of the conductive surfaces 27, we apply a photoconductive material such as cadmium sulphide activated as for example by copper and halogens as is well-known in the art. The photoconductive material is preferably dispersed in a vehicle such as ethylcellulose acetate lacquer and the application is made by a spraying process. A suitable technique and proper materials are disclosed in the previously cited pending application, Ser. No. 631,131. The application is continued until the areas between the glass pedestals are partially filled with the photoconductive material as seen at 31.

After the photoconductive material has been sprayed upon the matrix, the assembly is fired again to sinter the photoconductive material to the matrix. It is desirable that a Vycor plate which is optically flat, be used to preserve the flatness of the device during the firing operation. This firing operation should preferably be controlled to prevent any decrease in the electroluminescent brightness of the electroluminescent layer 23. A furnace operated between 500 and 550° C. in which the device is placed for periods ranging from 10 minutes to one-half hour, does not cause any harmful effects to the electroluminescent layer 23.

After the photoconductive material is sintered in place by the firing, the tops of the glass columns are ground as seen in Fig. 4 with metallurgical polishing paper to expose the conductive surfaces or caps. The photoconductive material is, of course, ground only from the tops of the pillars.

To energize the device, there are two feasible methods. One method is by direct contact and is that illustrated in Fig. 4. In case of direct contact, one of the preferred structures is a screen 32 which is placed on top of the assembly. We have found that a screen of 400 mesh electroformed nickel or other suitable metal bonded by an air-drying type of silver paint or by fusible indium alloys to the conductive film caps, provides an adequate contact. In addition, such a screen is sufficiently transparent to permit light to pass to the photoconductive layer. In those situations where capacitive coupling is desired, we coat the conductive film surfaces or caps with an organic binder such as a silicone varnish or melamine alkyd resin. A flat electrode such as the screen mentioned above may then be placed on the insulating layer thus formed over the conductive surfaces to provide capacitive coupling to the surfaces.

In operating the device, a source of alternating current 33 is connected between the conductive layer 22 and the top electrode 32. The exciting voltage provided by the source 33 may be varied over a wide range of frequency depending upon the application to which the device is to be put.

This application is in part a continuation of co-pending application, Serial No. 651,791, filed April 9, 1957. In that application there are cited numerous applications to which the device of that invention may be put. In addition, there is explained the theory of operation and the purposes served by the various elements of the device there disclosed.

The invention should not be limited to the details of the specific embodiments disclosed, inasmuch as various modifications within the purview of the invention will suggest themselves to those skilled in the art. The invention should be limited only by the spirit and scope of the appended claims. Similar applications are feasible for the present invention and the theory of operation is also common to that invention and the present invention.

We claim:

1. In a method of fabricating a light amplifier and storage device having a photoconductive layer and an electroluminescent layer in series, the steps which comprise cutting at least a slot in a first surface of a glass blank, the bottom of said slot being at a point adjacent the opposite surface of said blank, packing said slot with inert material to a point a predetermined distance beneath said first surface, applying a conductive film over said first surface, said packed material and the exposed walls of said slot, removing said material and only that part of said conductive film which is supported by said material, bonding said first surface of said glass blank to said electroluminescent layer, grinding the opposite surface of said blank to a depth which includes the bottom of said slot, placing photoconductive material in said slot from said opposite surface, forming an electrode on said opposite surface and making electrical connections to said electrode and to said electroluminescent layer.

2. The method of fabricating a light amplifier and storage device which comprises cutting a plurality of slots in a side of a glass blank, filling said slots with an easily removable material to a predetermined distance below the surface of said side, applying a conductive coating to said side, removing said material and said coating from said slots except for that portion of said coating extending said predetermined distance below said surface of said slide, preparing an electroluminescent member and an electrical connection thereto, sealing said slotted side of said blank to said electroluminescent member, forming an opaque webbing on said electroluminescent member in said slots, grinding the other side of said blank at least until the material of said blank between said slots is ground away, applying a conductive coating to the ground surfaces of said other side of said blank, applying a quantity of photoconductive material to said other side of said blank to at least cover the walls of said slots, and sealing an electrode to the conductive coating on said ground surfaces.

3. The method of fabricating a light amplifier and storage device which comprises, cutting a plurality of slots in a first surface of a glass blank, applying a conductive film to said surface and to the walls of said slots adjacent said first surface, preparing an electroluminescent member and an electrical connection thereto, sealing said blank to said member with the slotted surface in contact with said member, grinding the opposite surface of said blank until said blank is divided into segments separated by said slots, applying a conductive coating to said opposite surface, placing a quantity of photoconductive material in said slots from said opposite surface, and forming an electrode to contact said opposite surface.

4. In the fabrication of a light amplifier and storage device which includes a photoconductive layer and an electroluminescent layer in series, the method of controlling the distance in said photoconductive layer through which current flows which comprises slotting a first surface of a glass blank, forming a conductive film on said first surface and on the walls of the slots to a predetermined point below said first surface, sealing said first surface to said electroluminescent layer, grinding the surface of said blank opposite said first surface to expose said slots and thereby to divide said blank into segments, placing a conductive coating on said ground surfaces, and placing photoconductive material between said segments, current flow in said material being confined to that portion of said photoconductive material lying between said predetermined point in said slots and said conductive coating on said ground surfaces.

5. In the fabrication of a light amplifier and storage device having an electroluminescent layer and a photoconductive layer in series, the method of controlling the distance through which current flows in the material of which the photoconductive layer is formed which comprises forming a matrix from a glass blank by slotting one surface of said blank, masking a portion of the walls of the slots, applying a conductive film to said one surface and the unmasked portion of the walls of the slots, grinding away the opposite surface of said blank to divide said blank into segments, placing a conductive film on the ground surfaces, and placing said photoconductive material between said segments, current flow therethrough being confined to that portion of said photoconductive material lying between the closest adjacent points of said conductive film on said slots and the conductive film on said ground surfaces.

6. The method of fabricating a light amplifier and storage device which comprises, cutting a first plurality of parallel slots in a side of glass blank, cutting a second plurality of parallel slots in said side of said blank, said second plurality of slots being perpendicular to said first plurality of slots, filling said slots with refractory material, vibrating said blank to pack said material into said slots a predetermined distance beneath the surface of said blank, applying a conductive coating over the slotted side of said blank, washing away said refractory material and all of said conductive coating except that on said surface and that which extends said predetermined distance into said slots, preparing an electroluminescent member and an electrical connection thereto, sealing said slotted side of said blank to said electroluminescent member, forming an apaque webbing on said electroluminescent member in the area of said slots, grinding the side of said blank opposite the slotted side thereof to remove portions of said blank between said slots and to leave a plurality of independent glass pedestals, applying a conductive coating to the tops of said pedestals, applying photoconductive material to said glass pedestals to fill the areas between said pedestals, removing excess photoconductive material covering the conductive coating on said pedestals, and sealing an electrode to said conductive coating on said pedestals.

References Cited in the file of this patent

UNITED STATES PATENTS

| | | |
|---|---|---|
| 1,698,289 | Abbott | Jan. 8, 1929 |
| 2,365,698 | Haigh | Dec. 26, 1944 |
| 2,641,439 | Williams | June 9, 1953 |
| 2,773,992 | Ullery | Dec. 11, 1956 |